(12) United States Patent
Fernandez Orellana et al.

(10) Patent No.: US 12,028,315 B2
(45) Date of Patent: Jul. 2, 2024

(54) METHODS, DEVICES, AND COMPUTER PROGRAM PRODUCTS FOR AUTHENTICATING PERIPHERAL DEVICE

(71) Applicant: EMC IP Holding Company LLC, Hopkinton, MA (US)

(72) Inventors: Pedro Fernandez Orellana, Shanghai (CN); Qiang Chen, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 324 days.

(21) Appl. No.: 17/524,051

(22) Filed: Nov. 11, 2021

(65) Prior Publication Data

US 2023/0127607 A1 Apr. 27, 2023

(30) Foreign Application Priority Data

Oct. 21, 2021 (CN) .......................... 202111229480.5

(51) Int. Cl.
*H04L 9/40* (2022.01)
*H04W 12/06* (2021.01)
*H04L 49/00* (2022.01)
*H04L 67/52* (2022.01)

(52) U.S. Cl.
CPC .......... *H04L 63/0209* (2013.01); *H04L 63/08* (2013.01); *H04W 12/06* (2013.01); *H04L 49/30* (2013.01); *H04L 67/52* (2022.05)

(58) Field of Classification Search
CPC .. H04L 63/0876; H04L 63/107; H04W 12/63; H04W 12/06
See application file for complete search history.

(56) References Cited

U.S. PATENT DOCUMENTS

| 10,360,172 | B1* | 7/2019 | Thomas | G06F 13/4068 |
| 10,447,683 | B1* | 10/2019 | Loladia | H04W 12/71 |
| 2011/0205965 | A1* | 8/2011 | Sprigg | G06F 9/4411 |
| | | | | 709/201 |
| 2011/0307694 | A1* | 12/2011 | Broustis | H04L 63/0884 |
| | | | | 713/169 |

(Continued)

OTHER PUBLICATIONS

Wikipedia, "Desktop Virtualization," https://en.wikipedia.org/wiki/Desktop_virtualization, Jun. 7, 2021, 5 pages.

(Continued)

*Primary Examiner* — Tom Y Chang
(74) *Attorney, Agent, or Firm* — Ryan, Mason & Lewis, LLP

(57) ABSTRACT

Methods, devices, and computer program products for authenticating a peripheral device are provided in embodiments of the present disclosure. In one method, a peripheral device sends, to an edge device, a first authentication request for at least the peripheral device to use resources of the edge device, the first authentication request comprising at least a first identifier associated with the peripheral device and location information of the peripheral device. Then, the peripheral device receives an authentication success or failure indication from the edge device. In this way, effective authentication of a peripheral device can be realized with a less complicated authentication process, so that the security of access of the peripheral device to a virtual desktop can be improved while ensuring good user experience.

22 Claims, 6 Drawing Sheets

(56) References Cited

U.S. PATENT DOCUMENTS

2016/0037345 A1* 2/2016 Margadoudakis .... H04W 12/33
                                                    455/411
2017/0195339 A1* 7/2017 Brown .................... H04W 4/80
2018/0176748 A1* 6/2018 Kim .................... H04L 63/0861
2023/0351048 A1* 11/2023 Zhong .................... G06F 21/44

OTHER PUBLICATIONS

VMWare, "Virtual Desktop Infrastructure (VDI)" https://www.vmware.com/topics/glossary/content/virtual-desktop-infrastructure-vdi, Accessed Aug. 10, 2021, 8 pages.
VMWare, "Desktop as a Service (DaaS)" https://www.vmware.com/topics/glossary/content/desktop-as-a-service, Accessed Aug. 10, 2021, 7 pages.
Wikipedia, "Google Stadia," https://en.wikipedia.org/wiki/Google_Stadia, Aug. 2, 2021, 15 pages.
U.S. Appl. No. 17/398,100 filed in the name of Pedro Fernandez Orellana et al. on Aug. 10, 2021, and entitled "Method, Electronic Device, and Computer Program Product for Using Virtual Desktop.".

* cited by examiner

METHODS, DEVICES, AND COMPUTER PROGRAM PRODUCTS FOR AUTHENTICATING PERIPHERAL DEVICE

RELATED APPLICATION(S)

The present application claims priority to Chinese Patent Application No. 202111229480.5, filed Oct. 21, 2021, and entitled "Methods, Devices, and Computer Program Products for Authenticating Peripheral Device," which is incorporated by reference herein in its entirety.

FIELD

Embodiments of the present disclosure relate to the field of computers and, in particular, to methods, devices, and computer program products for authenticating a peripheral device.

BACKGROUND

Virtual desktops can be used to achieve remote dynamic access to desktop systems. For example, virtual desktops can be used to access files, install and run applications, and so on. Typically, users use virtual desktops through client devices. For example, users can access virtual desktops using applications or browsers running on the client devices. However, the computational processing performed when using the virtual desktops is usually completed by using resources of remote servers, and therefore, there is a waste of hardware and software resources of the client devices.

For this reason, it is proposed to use peripheral devices with the capability to directly connect to edge devices to realize the use of virtual desktops. Therefore, it is possible to directly connect peripheral devices to edge devices to access virtual desktops deployed on the edge devices without using hardware and software resources at clients. Therefore, effective authentication of peripheral devices by edge devices is an important prerequisite for protecting business security, so an effective and efficient authentication method is particularly important.

SUMMARY

Generally, embodiments of the present disclosure provide methods, devices, and computer program products for authenticating a peripheral device.

In a first aspect of the present disclosure, a method implemented at a peripheral device is provided. The method includes sending, to an edge device, a first authentication request for at least the peripheral device to use resources of the edge device. The first authentication request includes at least a first identifier associated with the peripheral device and location information of the peripheral device. The method further includes receiving an authentication success or failure indication from the edge device.

In a second aspect of the present disclosure, a method implemented at an edge device is provided. The method includes receiving, from a peripheral device, a first authentication request for at least the peripheral device to use resources of the edge device. The first authentication request includes at least a first identifier associated with the peripheral device and location information of the peripheral device. The method further includes authenticating, based on at least the first identifier and the location information of the peripheral device, at least the peripheral device to use the resources of the edge device. The method further includes sending an authentication success or failure indication to the peripheral device.

In a third aspect of the present disclosure, a peripheral device is provided. The device includes a processor and a memory storing computer-executable instructions. The computer-executable instructions, when executed by the processor, cause the device to perform actions including sending, to an edge device, a first authentication request for at least the peripheral device to use resources of the edge device. The first authentication request includes at least a first identifier associated with the peripheral device and location information of the peripheral device. The actions further include receiving an authentication success or failure indication from the edge device.

In a fourth aspect of the present disclosure, an edge device is provided. The device includes a processor and a memory storing computer-executable instructions. The computer-executable instructions, when executed by the processor, cause the device to perform actions including receiving, from a peripheral device, a first authentication request for at least the peripheral device to use resources of the edge device. The first authentication request includes at least a first identifier associated with the peripheral device and location information of the peripheral device. The actions further include authenticating, based on at least the first identifier and the location information of the peripheral device, at least the peripheral device to use the resources of the edge device. The actions further include sending an authentication success or failure indication to the peripheral device.

In a fifth aspect of the present disclosure, a computer program product is provided. The computer program product is tangibly stored on a computer-readable medium and includes machine-executable instructions. The machine-executable instructions, when executed, cause a machine to perform the method according to the first aspect.

In a sixth aspect of the present disclosure, a computer program product is provided. The computer program product is tangibly stored on a computer-readable medium and includes machine-executable instructions. The machine-executable instructions, when executed, cause a machine to perform the method according to the second aspect.

It should be understood that the content described in this Summary is neither intended to limit key or essential features of the embodiments of the present disclosure, nor intended to limit the scope of the present disclosure. Other features of the present disclosure will become readily understood from the following description.

BRIEF DESCRIPTION OF THE DRAWINGS

The above and other features, advantages, and aspects of the embodiments of the present disclosure will become more apparent with reference to the accompanying drawings and the following detailed description. In the accompanying drawings, identical or similar reference numerals represent identical or similar elements, in which.

DETAILED DESCRIPTION

Figure 1:
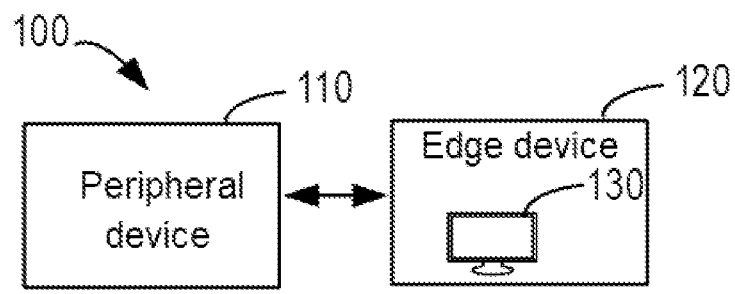
FIG. 1 shows a schematic diagram of an environment in which the embodiments of the present disclosure may be implemented.

The principles of the embodiments of the present disclosure will be described below with reference to several example embodiments shown in the accompanying drawings. Although example embodiments of the present disclosure are illustrated in the accompanying drawings, it should be understood that these embodiments are described only to enable those skilled in the art to better understand and then implement the embodiments of the present disclosure, and are not intended to impose any limitation to the scope of the present disclosure.

The term "include" and variants thereof used herein indicate open-ended inclusion, that is, "including but not limited to." Unless otherwise stated, the term "or" means "and/or." The term "based on" denotes "at least partially based on." The terms "an example embodiment" and "some embodiments" mean "at least one example embodiment." The term "another embodiment" means "at least one further embodiment." The terms "first," "second," and the like may refer to different or the same objects. Other explicit and implicit definitions may also be included below.

As used herein, the term "determine" encompasses a variety of actions. For example, "determine" may include operating, computing, processing, exporting, surveying, looking up (for example, looking up in a table, a database, or another data structure), identifying, and the like. In addition, "determine" may include receiving (for example, receiving information), accessing (for example, accessing data in a memory), and the like. In addition, "determine" may include parsing, selecting, choosing, establishing, and the like.

The term "peripheral device" as used herein refers to an apparatus or device used for information processing on a user side. As an example, examples of the peripheral device may include, but are not limited to, the following types of devices: a mouse, a keyboard, a display, a camera, an earphone, a microphone, and the like.

The term "edge device" as used herein refers to a device used for edge computing. Edge device may be an apparatus or device that provides resources such as storage resources, computing resources, and network bandwidth to another client (a terminal or device such as a mobile station, a smart phone, a smart watch, a personal digital assistant (PDA), a mobile phone, a device using a wireless modem, a laptop computer and/or touch screen computer, a tablet, a game console, a notebook, and a multimedia device, as well as the above peripheral device).

In recent years, related technologies of virtual desktops have been continuously developed. As mentioned above, the computational processing performed when using virtual desktops is usually completed by using resources of remote servers, and therefore, there is a waste of hardware and software resources of client devices. The continuous development of virtual desktops and similar technologies has promoted the development of personal computing devices, such as thin client devices and zero client devices. However, these client devices still need to have local computing resources, storage resources, and so on. In addition, it is very difficult to manage and maintain different client devices and programs for use of virtual desktops on corresponding client devices. In addition, data needs to be sent to remote servers (e.g., cloud data center servers) for computational processing, which may result in high consumption of network resources. In this case, conventional solutions using virtual desktops have difficulties achieving rapid response to user interactions, thereby leading to a poor user experience.

For this reason, an emerging way of efficient interaction between a user side and virtual desktop infrastructure has been proposed. Peripheral devices may be provided with the capability to directly and independently communicate with edge devices, so that they can directly use virtual desktops without any intermediary or other auxiliary connections. Therefore, it is possible to directly connect peripheral devices to edge devices without using hardware and software resources at clients, so as to completely move computation and storage to remote infrastructure, thus realizing real zero clients. By directly processing user data at edge devices, the consumption of network resources caused by transmitting user data to a cloud for processing may be reduced, thereby reducing the delay, and thus providing better experience for users in some scenarios requiring low delay (e.g., using game applications, video and audio related applications, and the like). Direct processing of user data at an edge device can also improve data security and privacy. With the continuous development of fifth-generation (5G) technology, this flexible and easy-to-operate interaction method can be more widely used.

However, effective authentication of peripheral devices by edge devices is an important prerequisite for the above-noted protection of business security, and therefore, an effective and efficient authentication method is particularly important. In addition, it is expected that direct access to virtual desktops will be widely used in private computers, computers used for personal work purposes, and even shared computers used for corporate business in the future. Therefore, direct access to virtual desktops is adapted to different users and configuration documents, and the authentication of edge devices can put forward new requirements for different application scenarios to achieve different levels of security and convenience. In addition, providing a secure, intuitive, and user-friendly authentication solution for a peripheral device is still a problem to be solved.

A solution for authenticating a peripheral device is provided in embodiments of the present disclosure. In this solution, the peripheral device sends, to an edge device, an authentication request for at least the peripheral device to use resources of the edge device, and the authentication request includes at least an identifier associated with the peripheral device and location information of the peripheral device. Correspondingly, the edge device receives the authentication request, and authenticates the peripheral device based on the identifier and the location information of the peripheral device. Then, the edge device sends an authentication success or failure indication to the peripheral device. In this way, effective authentication of a peripheral device can be realized with a less complicated authentication process, so that the security of access of the peripheral device to a virtual desktop can be improved while ensuring good user experience.

Basic principles and several example embodiments of the present disclosure are described below with reference to FIG. 1 to FIG. 6. It should be understood that these example embodiments are provided merely to enable those skilled in the art to better understand and then implement embodiments of the present disclosure, and are not intended to impose any limitation on the scope of the present disclosure.

FIG. 1 shows environment 100 in which the embodiments of the present disclosure may be implemented. As shown in FIG. 1, environment 100 includes peripheral device 110 and edge device 120. There is a communication connection between peripheral device 110 and edge device 120. Peripheral device 110 can communicate with edge device 120 using wireless communication. For example, peripheral device 110 may have a 5G, a WiFi 6, or an Ethernet communication interface to achieve communication with edge device 120. The peripheral device 110 may have a communication connection with another peripheral device (not shown). Peripheral device 110 may be associated with different users. For example, a plurality of users can operate peripheral device 110 separately at different times.

As shown in FIG. 1, virtual desktop 130 can be deployed on edge device 120 for a user to perform operations such as computing and storage. Virtual desktop 130 may be used by different users. In some other embodiments, a plurality of virtual desktops (not shown) may be deployed on edge device 120. These virtual desktops may be used by the same user for different purposes, or may be used by different users. The scope of the present disclosure is not limited in this regard. In some embodiments, edge device 120 may be associated with a base station of a network service provider. For example, edge device 120 may be deployed on a base station side. In particular, edge device 120 may be deployed on a 5G distributed base station side to implement high-quality communication between edge device 120 and peripheral device 110.

It should be understood that environment 100 shown in FIG. 1 is merely an example and should not constitute any limitation to the functions and scope of the implementations described in the present disclosure. The numbers of peripheral devices and edge devices shown in FIG. 1 are given for illustrative purposes. Environment 100 may include any suitable number of peripheral devices and edge devices. For example, environment 100 may also include a cloud, and the cloud may communicate with at least one of peripheral device 110 and edge device 120. The cloud can host a scheduling service for managing and scheduling at least one of peripheral device 110 and edge device 120.

Figure 2:
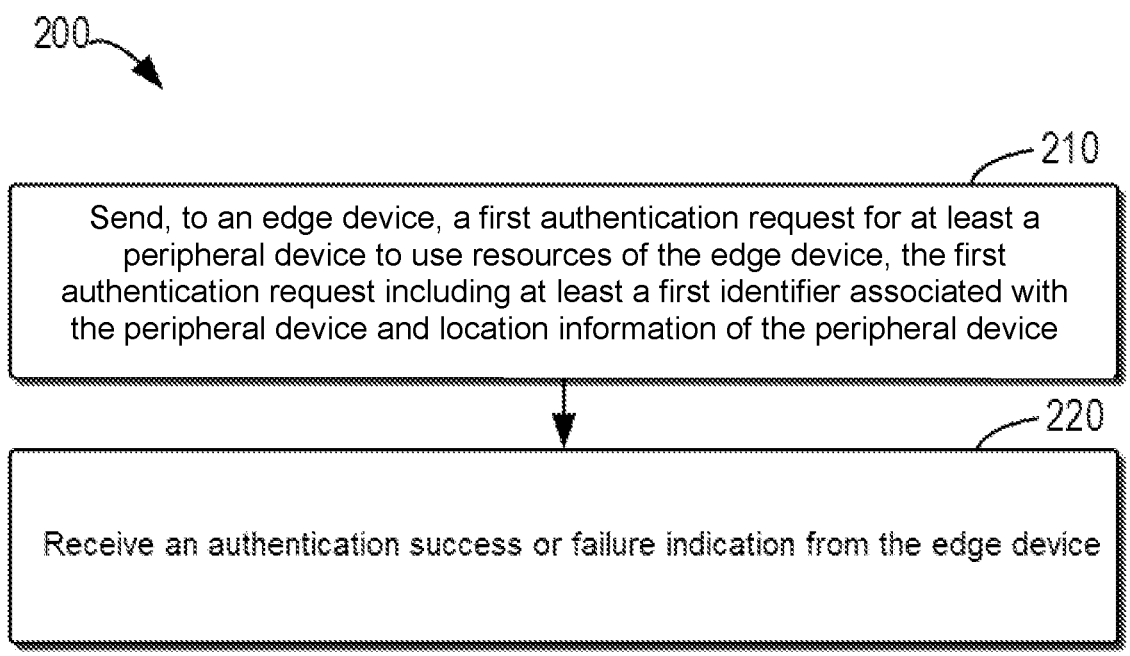
FIG. 2 shows a flow chart of an example method implemented at a peripheral device according to some embodiments of the present disclosure.

FIG. 2 shows a flow chart of example method 200 implemented at a peripheral device according to some embodiments of the present disclosure. For example, method 200 may be performed by peripheral device 110 as shown in FIG. 1. It should be understood that method 200 may also be performed by other devices, and the scope of the present disclosure is not limited in this regard. It should also be understood that method 200 may also include additional actions not shown and/or omit the actions shown, and the scope of the present disclosure is not limited in this regard.

As shown in FIG. 2, at block 210, peripheral device 110 sends to edge device 120 an authentication request (also referred to as a first authentication request) for at least peripheral device 110 to use resources of edge device 120, and the first authentication request at least includes an identifier (also referred to as a first identifier) associated with peripheral device 110 and location information of peripheral device 110. For example, the location information of peripheral device 110 may be obtained through the Internet using a chip built in to peripheral device 110. In some embodiments, the first authentication request may also include other related auxiliary authentication information, such as historical authentication related information of peripheral device 110.

In some embodiments, peripheral device 110 may be configured to send the first authentication request to edge device 120 if an instruction for authentication is received from a user. For example, in the case where peripheral device 110 has keys, peripheral device 110 may be configured to send the first authentication request to edge device 120 if it is detected that the user presses specific keys in a specific order or the user presses a specific key continuously for a specific time. In some embodiments, peripheral device 110 may use an indicator light thereof to indicate that it has received an instruction for authentication from the user. For example, it may flash the indicator light to indicate that it has received the instruction from the user.

In some embodiments, peripheral device 110 may receive an identifier (also referred to as a second identifier) associated with peripheral device 110 and input by the user. Then, peripheral device 110 may send the received second identifier to edge device 120 for subsequent authentication. In some other embodiments, if peripheral device 110 does not acquire the identifier information input by the user, the authentication process may be performed without the user inputting the identifier information.

In some embodiments, if the above information is not successfully authenticated, peripheral device 110 may receive an indication from edge device 120 of further authentication of at least peripheral device 110 to use the resources of edge device 120. In some embodiments, peripheral device 110 may receive authentication information (also referred to as first authentication information) input by the user for further authentication of peripheral device 110 to use the resources of edge device 120. Correspondingly, peripheral device 110 may send an authentication request (also referred to as a second authentication request) including at least the first authentication information to edge device 120 to request further authentication of peripheral device 110. In some embodiments, the second authentication request may also include location information of peripheral device 110 or any other information acquired by peripheral device 110 for authentication.

Alternatively, peripheral device 110 may communicate with another peripheral device in its proximity and be matched with the other peripheral device based on an instruction of the user or an instruction of another peripheral device, or be set to be automatically matched with the other peripheral device. The matched group of peripheral devices may be used as a whole to request authentication for the group of peripheral devices from edge device 120, so that edge device 120 can authenticate the group of peripheral devices by only one single authentication, which further simplifies the authentication process. For example, a certain peripheral device may be selected from the group of peripheral devices to carry authentication information associated with the group of peripheral devices, so as to jointly request authentication from edge device 120. To facilitate discussion, peripheral device 110 selected to request edge device 120 for authentication of the group of peripheral devices is taken as an example. In some embodiments, peripheral device 110 may receive authentication information (also referred to as second authentication information) input by the user, for authenticating the group of peripheral devices to use the resources of edge device 120. Correspondingly, peripheral device 110 may send to edge device 120 an authentication request (also referred to as a third authentication request) including at least the second authentication information to request joint authentication of the group of peripheral devices from edge device 120. In some embodiments, the third authentication request may also include location information of the peripheral device or any other information acquired by the peripheral device for authentication.

To protect the privacy of different users, virtual desktop 130 deployed on edge device 120 may create accounts associated with different users, and all operations of the users will be associated with the accounts. Therefore, the authentication of peripheral device 110 by edge device 120 is to link to the account associated with the user. Therefore, in some embodiments, the above authentication information input by the user may also include account information, which may indicate an account status associated with the user. For example, the account information may indicate that there is no account associated with the user, so as to request edge device 120 to establish a new account for the user, for linking peripheral device 110 to the new account. Alternatively, the account information may indicate information such as the name of an existing account associated with the user, so as to request edge device 120 to link peripheral device 110 to the associated existing account. Alternatively, the indication of the account information may be notified to edge device 120 by the user through another device (such as a mobile phone or a laptop computer).

In some embodiments, depending on the type of peripheral device 110, peripheral device 110 may acquire, in various ways, the information input by the user. For example, if peripheral device 110 is a keyboard, the above authentication information may be acquired by detecting a typing order of the user on the keyboard. For example, if peripheral device 110 has buttons, the above authentication information may be acquired by detecting the order and time of pressing the buttons by the user. For example, if peripheral device 110 is a device that can track a motion trajectory, the above authentication information may be acquired by detecting its motion trajectory. For example, if peripheral device 110 is a device that can acquire audio, the above authentication information may be acquired by detecting voice characteristics of the user. For example, if peripheral device 110 is a device that can acquire images, the above authentication information may be acquired via acquired video or photos of the user. In some embodiments, depending on the number of keys involved in keyboard input, the number of buttons available for button input, the complexity of the trajectory formed in the motion input, the content of audio and video input, and the like, the security level of authentication may be set based on actual needs. The above authentication methods may be arbitrarily combined, and the scope of the present disclosure is not limited in this regard.

As shown in FIG. 2, at block 220, peripheral device 110 receives an authentication success or failure indication from edge device 120. If peripheral device 110 is successfully authenticated by edge device 120, peripheral device 110 will be connected to edge device 120 by default in subsequent operations. If peripheral device 110 is instructed to reconnect to another edge device, the above authentication process may be repeated.

In some embodiments, in order to further improve security, a strategy of logging out after a specified period may be adopted. That is, after the connection of peripheral device 110 to edge device 120 exceeds a certain period of time, peripheral device 110 will be disconnected. Peripheral device 110 may repeat the above authentication process to continue to connect to edge device 120.

In some embodiments, peripheral device 110 may use an indicator light thereof to reflect the received authentication success or failure indication. For example, if peripheral device 110 receives an authentication success indication, a green indicator light may be illuminated. If peripheral device 110 receives an authentication failure indication, a red indicator light may be illuminated.

In some embodiments, peripheral device 110 may be configured in a factory to automatically connect to a 5G network when it is powered on for the first time, and connect to edge device 120 through the 5G network, for sending to edge device 120 a registration verification request for requesting the edge device 120 to verify whether peripheral device 110 has been registered. The registration verification request may include at least an identifier associated with peripheral device 110 and location information of peripheral device 110. In some embodiments, if peripheral device 110 is pre-registered at edge device 120 by the user, peripheral device 110 can be successfully connected to edge device 120 to use virtual desktop 130 without performing the above authentication process. In some other embodiments, if peripheral device 110 has not been previously registered, peripheral device 110 receives, from edge device 120, information indicating that peripheral device 110 is not registered and instructing it to wait for subsequent operations. Then, peripheral device 110 waits for subsequent operations in order to perform the above authentication process.

Alternatively or additionally, instead of using peripheral device 110, the user may access virtual desktop 130 by using a conventional device (for example, a desktop computer, a laptop computer, or a smart phone) that independently performs the operations expected by the user.

The solution for authentication implemented at peripheral device 110 is described above with reference to FIGS. 1 and 2. Based on this solution, efficient authentication can be realized based on simple operations at peripheral device 110, thus improving the user experience. The authentication process implemented at edge device 120 will be described below with reference to FIG. 3.

Figure 3:
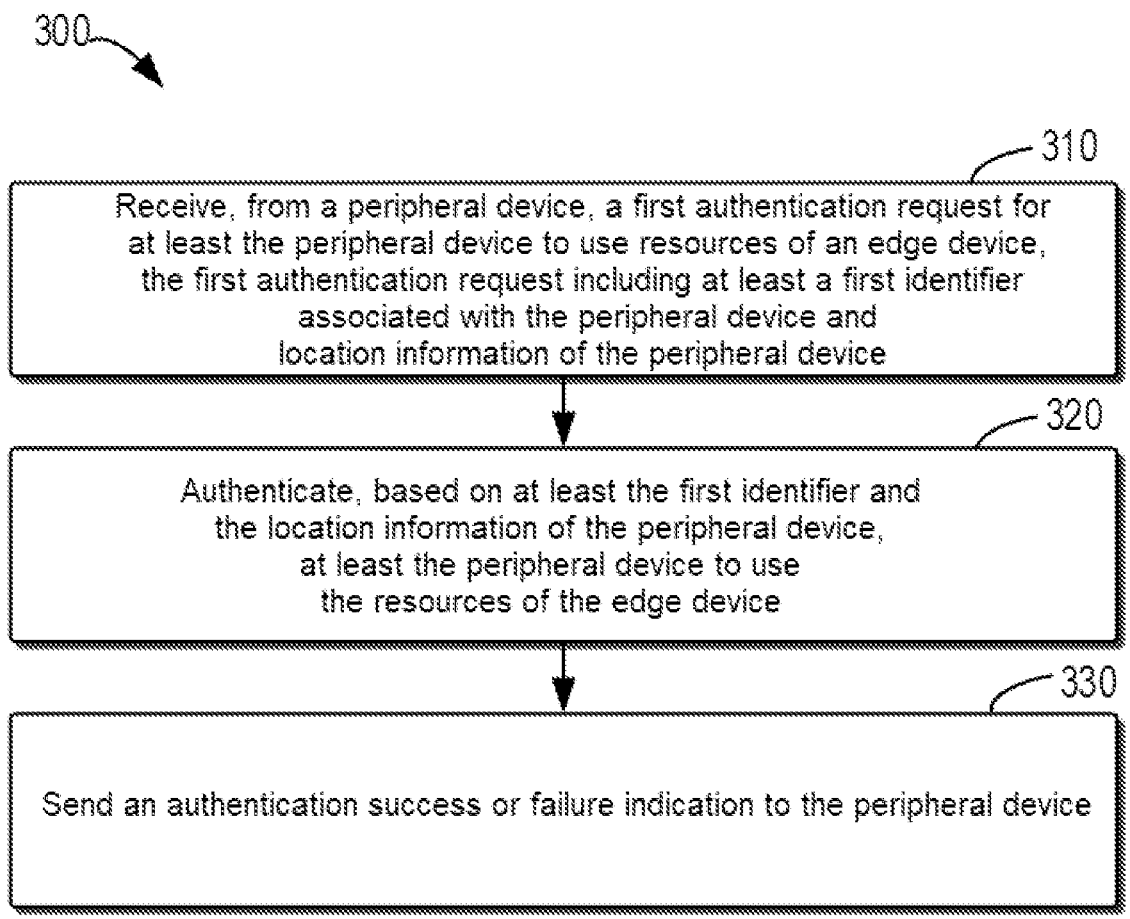
FIG. 3 shows a flow chart of an example method implemented at an edge device according to some embodiments of the present disclosure.

FIG. 3 shows a flow chart of example method 300 implemented at an edge device according to some embodiments of the present disclosure. For example, method 300 may be performed by edge device 120 as shown in FIG. 1. It should be understood that method 300 may also be performed by other devices, and the scope of the present disclosure is not limited in this regard. It should also be understood that method 300 may also include additional actions not shown and/or omit the actions shown, and the scope of the present disclosure is not limited in this regard.

As shown in FIG. 3, at block 310, edge device 120 receives, from peripheral device 110, an authentication request for at least peripheral device 110 to use resources of edge device 120. The authentication request includes at least a first identifier associated with peripheral device 110 and location information of peripheral device 110.

In some embodiments, edge device 120 may receive, from peripheral device 110, a second identifier associated with peripheral device 110 and input by a user. In some embodiments, peripheral device 110 may not need to acquire the second identifier information, that is, the authentication process may be performed without the user inputting the identifier information.

In some embodiments, edge device 120 may acquire location information of the user. For example, edge device 120 may acquire the location information from another device (such as a browser of a laptop computer or a browser of a mobile phone) used by the user to assist in registration to log in to virtual desktop 130.

As shown in FIG. 3, at block 320, edge device 120 authenticates, based on at least the first identifier and the location information of the peripheral device, at least the peripheral device to use the resources of edge device 120. In some embodiments, edge device 120 may authenticate at least the peripheral device based on the first identifier, the location information of the peripheral device, the second identifier, and the location information of the user. Alternatively, edge device 120 may authenticate at least the peripheral device only based on the location information of the peripheral device and the location information of the user.

As shown in FIG. 3, at block 330, edge device 120 sends an authentication success or failure indication to the peripheral device.

In some embodiments, if the first identifier matches the second identifier and a distance between the location information of peripheral device 110 and the location information of the user is less than a certain threshold distance (referred to as a threshold distance), edge device 120 may send an indication of success of the authentication to peripheral device 110. Alternatively, edge device 120 may send to peripheral device 110 an indication of success of the authentication only based on a determination that the distance between the location information of peripheral device 110 and the location information of the user is less than the threshold distance.

In some embodiments, if the first identifier and the second identifier do not match, but the distance between the location information of peripheral device 110 and the location information of the user is less than the threshold distance, edge device 120 may send, to peripheral device 110, an indication of further authentication of at least peripheral device 110 to use the resources of edge device 120. It should be understood that the above threshold distance may be pre-configured by the user, and the threshold distance may be set to any value according to actual needs, and the scope of the present disclosure is not limited in this regard.

In some embodiments, edge device 120 may receive a second authentication request from peripheral device 110, where the second authentication request includes first authentication information input by the user on peripheral device 110, and the first authentication information is used for further authenticating peripheral device 110 to use the resources of edge device 120. Correspondingly, if the received first authentication information matches reference authentication information (also referred to as first reference authentication information), edge device 120 sends an authentication success indication to peripheral device 110, for indicating to peripheral device 110 that the use of virtual desktop 130 on edge device 120 is permitted.

Alternatively, edge device 120 may receive a third authentication request from peripheral device 110. The third authentication request includes at least second authentication information input by the user on peripheral device 110, and the second authentication information is used for further authenticating a group of peripheral devices including peripheral device 110 to use the resources of edge device 120. Correspondingly, if the received second authentication information matches reference authentication information (also referred to as second reference authentication information), edge device 120 respectively sends an authentication success indication to the group of peripheral devices, for indicating that the use of virtual desktop 130 on edge device 120 is permitted. In some embodiments, the above-referenced authentication information may be pre-configured to edge device 120 by the user. Alternatively, the above-referenced authentication information may be pre-configured to assist in the first authentication without manual setting by the user.

In some embodiments, the above authentication information received by edge device 120 may also include account information indicating an account status associated with the user. If the account information indicates that there is no account associated with the user, edge device 120 generates a new account for the user and links peripheral device 110 to the new account. Correspondingly, if edge device 120 receives a request for authenticating a group of peripheral devices, edge device 120 links the group of peripheral devices to the new account. Alternatively, if the account information indicates specific information such as the name of an existing account associated with the user, edge device 120 links peripheral device 110 to the existing account. Correspondingly, if edge device 120 receives a request for authenticating a group of peripheral devices, edge device 120 links the group of peripheral devices to the associated existing account.

In some embodiments, as described above, a strategy of logging out after a specified period may be adopted. That is, after the connection of peripheral device 110 to edge device 120 exceeds a certain period of time, edge device 120 may cancel the authentication of peripheral device 110, so that peripheral device 110 is disconnected from edge device 120. In this way, the security of the business can be further improved.

In some embodiments, before the above authentication process, edge device 120 may receive a registration verification request from peripheral device 110 to verify whether peripheral device 110 has been registered with edge device 120. The registration verification request may include at least a first identifier associated with peripheral device 110 and location information of peripheral device 110. If edge device 120 knows relevant information indicating that peripheral device 110 has been registered, a subsequent authentication process is not required, and peripheral device 110 can be directly connected to edge device 120 to access virtual desktop 130. If edge device 120 learns that there is no information matching the first identifier of peripheral device 110, information indicating that peripheral device 110 is not registered and instructing it to wait for subsequent operations is sent to peripheral device 110.

Figure 4:
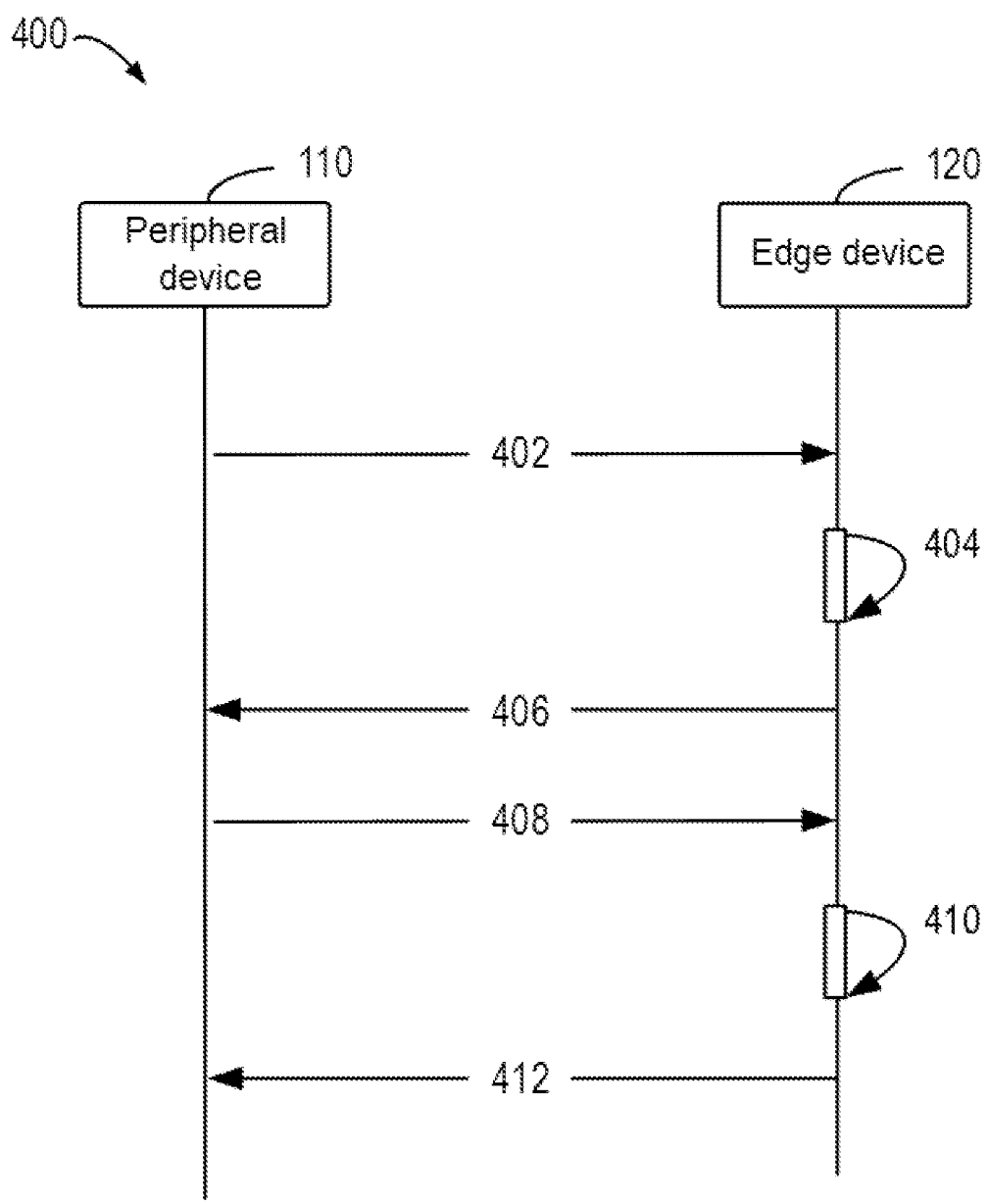
FIG. 4 shows a flow chart of an example authentication process between a peripheral device and an edge device according to some embodiments of the present disclosure.

Flow charts of example authentication processes carried out between peripheral device 110 and edge device 120 are discussed below with reference to respective FIGS. 4 and 5. FIG. 4 shows a flow chart of an example authentication process 400 between peripheral device 110 and edge device 120 according to some embodiments of the present disclosure. It should be understood that the example of FIG. 4 is merely illustrative and does not limit the scope of the present disclosure.

After peripheral device 110 is powered on, at 402, peripheral device 110 sends, to edge device 120, a registration verification request including a first identifier associated with peripheral device 110 and location information of peripheral device 110. Correspondingly, at 404, edge device 120 determines whether peripheral device 110 has been registered based on the information in the received registration verification request. If peripheral device 110 is not registered, at 406, edge device 120 sends, to peripheral device 110, information indicating that peripheral device 110 is not registered and instructing it to wait for subsequent operations. Then, peripheral device 110 waits for subsequent operations.

Edge device 120 may receive a second identifier associated with peripheral device 110 from peripheral device 110, and acquire location information of a user and account information associated with the user. After peripheral device 110 receives an instruction for authentication from the user, at 408, peripheral device 110 sends, to edge device 120, a first authentication request for peripheral device 110 to use resources of edge device 120. The first authentication request includes at least a first identifier associated with peripheral device 110 and location information of peripheral device 110. At 410, edge device 120 determines that the first identifier matches the second identifier, and the distance between the location information of peripheral device 110 and the location information of the user is less than a threshold distance. Then, at 412, edge device 120 sends an authentication success indication to peripheral device 110. Then, peripheral device 110 can be successfully linked to the account associated with the user on virtual desktop 130.

In this way, while making the overall authentication process easy for users to operate, it is ensured that peripheral device 110 can safely and efficiently access edge device 120, so as to realize the use of virtual desktop 130.

Figure 5:
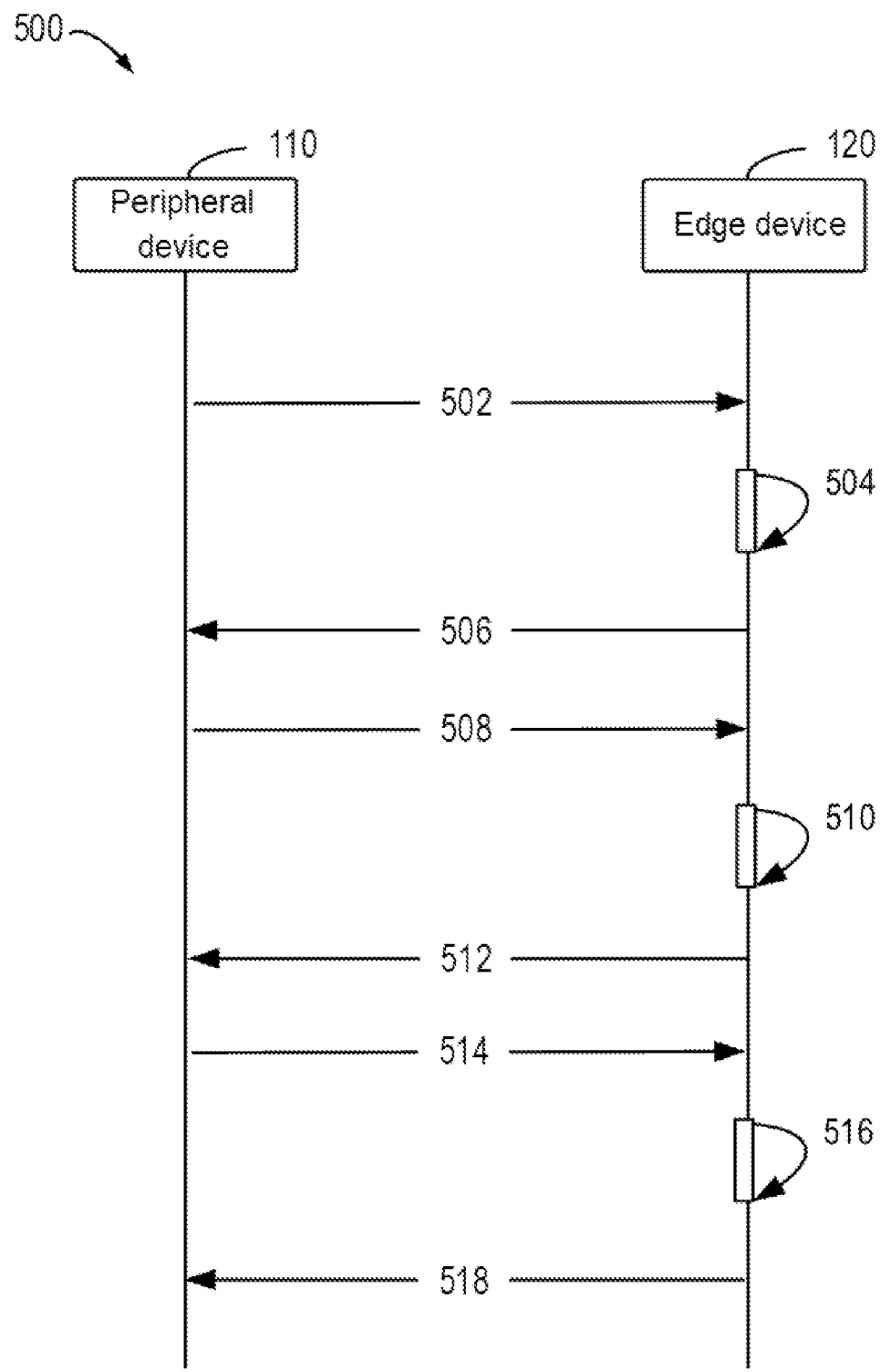
FIG. 5 shows a flow chart of another example authentication process between a peripheral device and an edge device according to some embodiments of the present disclosure.

FIG. 5 shows a flow chart of another example authentication process 500 between peripheral device 110 and edge device 120 according to some embodiments of the present disclosure. It should be understood that the example of FIG. 5 is merely illustrative and does not limit the scope of the present disclosure.

After peripheral device 110 is powered on, at 502, peripheral device 110 sends, to edge device 120, a registration verification request including a first identifier associated with peripheral device 110 and location information of peripheral device 110. Correspondingly, at 504, edge device 120 determines whether peripheral device 110 has been registered based on the information in the received registration verification request. If peripheral device 110 is not registered, at 506, edge device 120 sends, to peripheral device 110, information indicating that peripheral device 110 is not registered and instructing it to wait for subsequent operations. Then, peripheral device 110 waits for subsequent operations.

Edge device 120 may receive a second identifier associated with peripheral device 110 from peripheral device 110, acquire location information of a user and account information associated with the user, and acquire first reference authentication information for authenticating peripheral device 110. After peripheral device 110 receives an instruction for authentication from the user, at 508, peripheral device 110 sends, to edge device 120, a first authentication request for peripheral device 110 to use resources of edge device 120. The first authentication request includes at least a first identifier associated with peripheral device 110 and location information of peripheral device 110. At 510, edge device 120 determines that the first identifier and the second identifier do not match, but the distance between the location information of peripheral device 110 and the location information of the user is less a threshold distance. Then, at 512, edge device 120 sends to peripheral device 110 an indication of further authentication of peripheral device 110 to use the resources of edge device 120.

After peripheral device 110 receives first authentication information input by the user, at 514, peripheral device 110 sends, to edge device 120, a second authentication request including the first authentication information to request further authentication for peripheral device 110. At 516, peripheral device 110 determines that the first authentication information matches the first reference authentication information. Then, at 518, edge device 120 sends an authentication success indication to peripheral device 110. Then, peripheral device 110 can be successfully linked to the account associated with the user on virtual desktop 130.

In this way, edge device 120 can further authenticate peripheral device 110 based on its specific authentication method, thereby improving the security of the authentication process.

Figure 6:
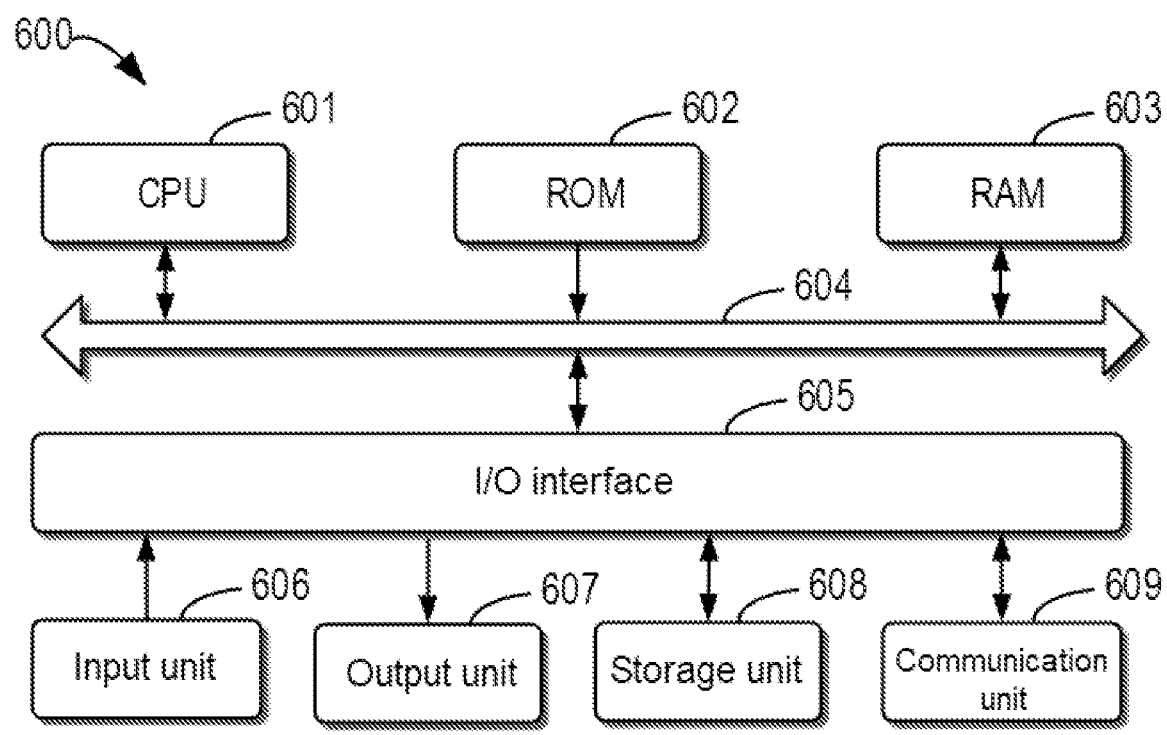
FIG. 6 shows a block diagram of an example computing device that can be used to implement embodiments of the present disclosure.

FIG. 6 shows a schematic block diagram of example device 600 that can be used to implement the embodiments of the present disclosure. For example, device 600 can be implemented at environment 100 as shown in FIG. 1. As shown in FIG. 6, device 600 includes central processing unit (CPU) 601 that may perform various appropriate actions and processing according to computer program instructions stored in read-only memory (ROM) 602 or computer program instructions loaded from storage unit 608 to random access memory (RAM) 603. Various programs and data required for the operation of device 600 may also be stored in RAM 603. CPU 601, ROM 602, and RAM 603 are connected to each other through bus 604. Input/output (I/O) interface 605 is also connected to bus 604.

A plurality of components in device 600 are connected to I/O interface 605, including: input unit 606, such as a keyboard and a mouse; output unit 607, such as various types of displays and speakers; storage unit 608, such as a magnetic disk and an optical disc; and communication unit 609, such as a network card, a modem, and a wireless communication transceiver. Communication unit 609 allows device 600 to exchange information/data with other devices via a computer network, such as the Internet, and/or various telecommunication networks.

The various processes and processing described above, for example, method 200 and method 300, can be performed by CPU 601. For example, in some embodiments, method 200 and method 300 may be implemented as a computer software program that is tangibly included in a machine-readable medium such as storage unit 608. In some embodiments, part of or all the computer programs may be loaded and/or installed onto device 600 via ROM 602 and/or communication unit 609. When the computer program is loaded to RAM 603 and executed by CPU 601, one or more actions of methods 200 and 300 described above may be executed.

Illustrative embodiments of the present disclosure include a method, an apparatus, a system, and/or a computer program product. The computer program product may include a computer-readable storage medium on which computer-readable program instructions for performing various aspects of the present disclosure are loaded.

The computer-readable storage medium may be a tangible device that may hold and store instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a RAM, a ROM, an erasable programmable read-only memory (EPROM or flash memory), an SRAM, a portable compact disc read-only memory (CD-ROM), a digital versatile disc (DVD), a memory stick, a floppy disk, a mechanical encoding device, for example, a punch card or a raised structure in a groove with instructions stored thereon, and any appropriate combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in the computing/processing device.

The computer program instructions for executing the operation of the present disclosure may be assembly instructions, instruction set architecture (ISA) instructions, machine instructions, machine-dependent instructions, microcode, firmware instructions, status setting data, or source code or object code written in any combination of one or more programming languages, the programming languages including object-oriented programming language such as Smalltalk and C++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer may be connected to a user computer through any kind of networks, including a local area network (LAN) or a wide area network (WAN), or may be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions to implement various aspects of the present disclosure.

Various aspects of the present disclosure are described here with reference to flow charts and/or block diagrams of the method, the apparatus (system), and the computer program product implemented according to the embodiments of the present disclosure. It should be understood that each block of the flow charts and/or the block diagrams and combinations of blocks in the flow charts and/or the block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in an inverse order, which depends on involved functions. It should be further noted that each block in the block diagrams and/or flow charts as well as a combination of blocks in the block diagrams and/or flow charts may be implemented by using a special hardware-based system that executes specified functions or actions, or implemented using a combination of special hardware and computer instructions.

Illustrative embodiments of the present disclosure have been described above. The above description is illustrative, rather than exhaustive, and is not limited to the disclosed various embodiments. Numerous modifications and alterations will be apparent to those of ordinary skill in the art without departing from the scope and spirit of the illustrated embodiments. The selection of terms used herein is intended to best explain the principles and practical applications of the various embodiments or the improvements to technologies on the market, so as to enable persons of ordinary skill in the art to understand the embodiments disclosed here.

What is claimed is:

1. A method implemented at a peripheral device, comprising:
   sending, to an edge device, a first authentication request for at least the peripheral device to use resources of the edge device, the first authentication request comprising at least a first identifier associated with the peripheral device and location information of the peripheral device; and
   receiving an indication of success or failure of the authentication from the edge device;
   wherein the first authentication request is configured by the peripheral device to initiate in the edge device an authentication process in which the edge device attempts to authenticate the peripheral device based on a comparison of the location information of the peripheral device and additional location information of a user associated with the peripheral device, wherein the additional location information is obtained by the edge device from a device other than the peripheral device; and wherein the first authentication request comprises a request to jointly authenticate the peripheral device as a first peripheral device and one or more additional peripheral devices that are collectively matched with one another based at least in part on their respective locations to form a group of matched peripheral devices including the first and additional peripheral devices, the first authentication request being sent to the edge device by the first peripheral device as a single joint authentication request for the group of peripheral devices.

2. The method according to claim 1, wherein sending the first authentication request for at least the peripheral device to use resources of the edge device comprises:
sending the first authentication request to the edge device in response to receiving an instruction for the authentication from the user.

3. The method according to claim 1, further comprising:
receiving a second identifier input by the user associated with the peripheral device; and
sending the second identifier to the edge device for the authentication.

4. The method according to claim 1, further comprising:
receiving, from the edge device, an indication of further authentication of at least the peripheral device to use the resources of the edge device.

5. The method according to claim 1, further comprising:
receiving authentication information input by the user and used for further authentication of the peripheral device to use the resources of the edge device; and
sending an additional authentication request comprising at least the authentication information to the edge device, for further authentication of the peripheral device to use the resources of the edge device.

6. The method according to claim 1, further comprising:
receiving authentication information input by the user and used for authentication of a group of peripheral devices comprising the peripheral device to use the resources of the edge device; and
sending an additional authentication request comprising at least the authentication information to the edge device, for authentication of the group of peripheral devices to use the resources of the edge device.

7. A computer program product tangibly stored on a computer-readable medium and comprising machine-executable instructions, wherein the machine-executable instructions, when executed, cause a machine to perform the method according to claim 1.

8. The method according to claim 1, wherein the first peripheral device is controllably operative in a plurality of different authentication modes including (i) an individual authentication mode in which a given authentication request comprises a request to authenticate only the first peripheral device and (ii) a group authentication mode in which a given authentication request comprises a request to jointly authenticate the first peripheral device and the one or more additional peripheral devices that with the first peripheral device collectively form the group of matched peripheral devices.

9. A method implemented at an edge device, comprising:
receiving, from a peripheral device, a first authentication request for at least the peripheral device to use resources of the edge device, the first authentication request comprising at least a first identifier associated with the peripheral device and location information of the peripheral device;
authenticating, based on at least the first identifier and the location information of the peripheral device, at least the peripheral device to use the resources of the edge device; and
sending an indication of success or failure of the authentication to the peripheral device;
wherein the authenticating further comprises the edge device comparing the location information of the peripheral device and additional location information of a user associated with the peripheral device, the additional location information being obtained by the edge device from a device other than the peripheral device; and
wherein the first authentication request comprises a request to jointly authenticate the peripheral device as a first peripheral device and one or more additional peripheral devices that are collectively matched with one another based at least in part on their respective locations to form a group of matched peripheral devices including the first and additional peripheral devices, the first authentication request being sent to the edge device by the first peripheral device as a single joint authentication request for the group of peripheral devices.

10. The method according to claim 9, further comprising:
receiving, from the peripheral device, a second identifier that is input by the user associated with the peripheral device; and
acquiring location information of the user.

11. The method according to claim 10, wherein sending the authentication success or failure indication to the peripheral device comprises:
in response to the first identifier matching the second identifier and a distance between the location information of the peripheral device and the location information of the user being less than a threshold distance, sending an indication of success of the authentication to the peripheral device.

12. The method according to claim 10, further comprising:
in response to the first identifier not matching the second identifier and a distance between the location information of the peripheral device and the location information of the user being less than a threshold distance, sending an indication of further authentication of at least the peripheral device to use the resources of the edge device.

13. The method according to claim 9, further comprising:
receiving, from the peripheral device, an additional authentication request for further authentication of the peripheral device to use the resources of the edge device, the additional authentication request comprising at least authentication information that is input by the user and used for further authentication of the peripheral device; and
in response to the received authentication information matching reference authentication information, sending an indication of success of the authentication to the peripheral device.

14. The method according to claim 9, further comprising:

receiving, from the peripheral device, an additional authentication request for authentication of a group of peripheral devices comprising the peripheral device to use the resources of the edge device, the additional authentication request comprising at least authentication information that is input by the user and used for authentication of the group of peripheral devices; and in response to the received authentication information matching reference authentication information, sending an indication of success of the authentication to the peripheral device, wherein the method further comprises:

sending an indication of success of the authentication to another peripheral device in the group of peripheral devices.

15. An edge device, comprising:

a processor; and a memory having computer-executable instructions stored therein, wherein the computer-executable instructions, when executed by the processor, cause the edge device to perform the method according to claim 9.

16. A computer program product tangibly stored on a computer-readable medium and comprising machine-executable instructions, wherein the machine-executable instructions, when executed, cause a machine to perform the method according to claim 9.

17. A peripheral device, comprising:

at least one processor; and a memory having computer-executable instructions stored therein, wherein the computer-executable instructions, when executed by the at least one processor, cause the peripheral device to perform actions comprising:

sending, to an edge device, a first authentication request for at least the peripheral device to use resources of the edge device, the first authentication request comprising at least a first identifier associated with the peripheral device and location information of the peripheral device; and receiving an indication of success or failure of the authentication from the edge device;

wherein the first authentication request is configured by the peripheral device to initiate in the edge device an authentication process in which the edge device attempts to authenticate the peripheral device based on a comparison of the location information of the peripheral device and additional location information of a user associated with the peripheral device, wherein the additional location information is obtained by the edge device from a device other than the peripheral device; and wherein the first authentication request comprises a request to jointly authenticate the peripheral device as a first peripheral device and one or more additional peripheral devices that are collectively matched with one another based at least in part on their respective locations to form a group of matched peripheral devices including the first and additional peripheral devices, the first authentication request being sent to the edge device by the first peripheral device as a single joint authentication request for the group of peripheral devices.

18. The peripheral device according to claim 17, wherein the actions further comprise:

receiving a second identifier input by the user associated with the peripheral device; and sending the second identifier to the edge device for the authentication.

19. The peripheral device according to claim 17, wherein the actions further comprise:

receiving, from the edge device, an indication of further authentication of at least the peripheral device to use the resources of the edge device.

20. The peripheral device according to claim 17, wherein the actions further comprise:

receiving authentication information input by the user and used for further authentication of the peripheral device to use the resources of the edge device; and sending an additional authentication request comprising at least the authentication information to the edge device, for further authentication of the peripheral device to use the resources of the edge device.

21. The peripheral device according to claim 17, wherein the actions further comprise:

receiving authentication information input by the user and used for authentication of a group of peripheral devices comprising the peripheral device to use the resources of the edge device; and sending an additional authentication request comprising at least the authentication information to the edge device, for authentication of the group of peripheral devices to use the resources of the edge device.

22. The peripheral device according to claim 17, wherein the first peripheral device is controllably operative in a plurality of different authentication modes including (i) an individual authentication mode in which a given authentication request comprises a request to authenticate only the first peripheral device and (ii) a group authentication mode in which a given authentication request comprises a request to jointly authenticate the first peripheral device and the one or more additional peripheral devices that with the first peripheral device collectively form the group of matched peripheral devices.

* * * * *